(12) United States Patent
Wallens

(10) Patent No.: US 8,821,257 B2
(45) Date of Patent: Sep. 2, 2014

(54) SYSTEM AND METHOD FOR OPERATING A COMPETITIVE SPORTS MARKET BASED ON RANKING

(76) Inventor: Jordan Wallens, Los Angeles, CA (US)

( * ) Notice: Subject to any disclaimer, the term of this patent is extended or adjusted under 35 U.S.C. 154(b) by 350 days.

(21) Appl. No.: 13/420,603

(22) Filed: Mar. 14, 2012

(65) Prior Publication Data

US 2012/0238352 A1 Sep. 20, 2012

Related U.S. Application Data

(60) Provisional application No. 61/452,554, filed on Mar. 14, 2011.

(51) Int. Cl.
*G06F 17/00* (2006.01)
(52) U.S. Cl.
USPC .......................................................... 463/25
(58) Field of Classification Search
USPC .................................. 463/16–25; 705/35–37
See application file for complete search history.

(56) References Cited

U.S. PATENT DOCUMENTS

| | | | |
|---|---|---|---|
| 6,910,965 B2 | 6/2005 | Downes | |
| 7,233,922 B2 | 6/2007 | Asher et al. | |
| 7,302,412 B1 | 11/2007 | Speck | |
| 7,496,531 B1 * | 2/2009 | Gastineau et al. | 705/35 |
| 7,630,986 B1 * | 12/2009 | Herz et al. | 1/1 |
| 7,908,199 B2 * | 3/2011 | Neff et al. | 705/37 |
| 8,131,621 B1 * | 3/2012 | Gastineau et al. | 705/36 R |
| 2005/0171878 A1 | 8/2005 | Pennock | |

OTHER PUBLICATIONS

International Search Report and Written Opinion dated Oct. 12, 2012 for corresponding PCT Application No. US2012/029137 (7 pages).
Intrade The Prediction Market Limited, "Home," <http://www.intrade.com/v4/home> Accessed Oct. 30, 2012, 2 pages.
Intrade The Prediction Market Limited, "The Basics," <http://www.intrade.com/v4/misc/howItWorks/theBasics.jsp> Accessed Oct. 30, 2012, 4 pages.
Iowa Electronic Markets, "Frequently Asked Questions," University of Iowa, Henry B. Tippie College of Business, <http://ippie.uiowa.edu/iem/faq.html> Accessed Oct. 30, 2012, 6 pages.
Iowa Electronic Markets, "IEM", University of Iowa, Henry B. Tippie College of Business, <http://ippie.uiowa.edu/iem> Accessed Oct. 30, 2012, 2 pages.

* cited by examiner

*Primary Examiner* — Ronald Laneau
(74) *Attorney, Agent, or Firm* — Christie, Parker & Hale, LLP

(57) ABSTRACT

A method of operating a market for a plurality of participants to invest in a plurality of competitors using a computer system includes: storing a plurality of share holdings of the participants in the computer system; storing a plurality of credit balances of the participants in the computer system; and redeeming shares at the conclusion of a period in the computer system, wherein redeeming shares includes: calculating an amount that the credit balance of each corresponding participant of the participants should be modified in accordance with a plurality of values of corresponding ones of the shares at the conclusion of the period and the share holdings of the corresponding participant, and determining the values of the shares based on a benchmark ranking of the competitors at the conclusion of the period.

24 Claims, 27 Drawing Sheets

FIG. 4

HOME/PROFILE/ADD BANK ACCOUNT

BANK ACCOUNT

ACCOUNT NAME

BANK NAME

ROUTING NUMBER

ACCOUNT NUMBER

ADD

FIG.5

PURCHASE SPORTSGUNNER CREDITS

○ 500 CREDITS($0.99)  ○ 1,000 CREDITS($1.99)  ○ 1,000 CREDITS($2.99)  ○ 1,000 CREDITS($4.99)

*'S REQUIRED

*NAME ON ACCOUNT:

*CREDIT CARD TYPE:     SELECT CREDIT CARD TYPE     *BILLING ADDRESS:

*CREDIT CARD NUMBER:                               *CITY:

*EXPIRATION DATE:     YEAR   MONTH                 *STATE:     SELECT A STATE

*CVV:                                              *ZIPCODE:

[SUBMIT]

FIG.6

HOME/PROFILE/ADD FUNDS

ADD FUNDS

CURRENT BALANCE  $14,294.75

ACCOUNT   ○ CREDIT CARD — —

○ BANK ACCOUNT— WACHOVIA— JORDAN WALLENS

AMOUNT [         ] USD

[ADD]

*FIG. 7*

| BUY SHARES:OREGON | | | X |
|---|---|---|---|
| SPORTFOLIO | | SELL | BUY |
| SPORTS EXCHANGE | | | |
| QTY | PRICE | TRANSACTION FEE | TOTAL |
| 5 | $ | 1 USD | 0 USD |
| | | PLACE ORDER | CLOSE |

FIG. 8

JULY 25, 2011
TRADE CENTER

| SPORTSGUNNER POINTS | PORTFOLIO VALUE | AVAILABLE CREDIT |
|---|---|---|
| 0 | 556.25 | 9993.75 |

TOP 10

| NCAA FOOTBALL | | NFL FOOTBALL | MLB BASEBALL | |
|---|---|---|---|---|
| #1 25.00 | [TEAM LOGO] FLORIDA GATORS | NEW ORLEANS SAINTS | #1 25.00 | [TEAM LOGO] NEW YORK YANKEES |
| #2 24.00 | [TEAM LOGO] ALABAMA CRIMSON TIDE | INDIANAPOLIS COLTS | #2 24.00 | [TEAM LOGO] TAMPA BAY RAYS |
| #3 23.00 | [TEAM LOGO] TEXAS LONGHORNS | MINNESOTA VIKINGS | #3 23.00 | [TEAM LOGO] SAN DIEGO PADRES |
| #4 22.00 | [TEAM LOGO] USC TROJANS | DENVER BRONCOS | #4 22.00 | [TEAM LOGO] MINNESOTA TWINS |
| #5 21.00 | [TEAM LOGO] CINCINNATI BEARCATS | NEW ENGLAND PATRIOTS | #5 21.00 | [TEAM LOGO] ATLANTA BRAVES |
| #6 20.00 | [TEAM LOGO] BOISE ST. BRONCOS | CINCINNATI BENGALS | #6 20.00 | [TEAM LOGO] CINCINNATI REDS |
| #7 19.00 | [TEAM LOGO] IOWA HAWKEYES | PITTSBURGH STEELERS | #7 19.00 | [TEAM LOGO] TEXAS RANGERS |
| #8 18.00 | [TEAM LOGO] TCU HORNED FROGS | DALLAS COWBOYS | #8 18.00 | [TEAM LOGO] BOSTON RED SOX |
| #9 17.00 | [TEAM LOGO] LSU TIGERS | PHILADELPHIA EAGLES | #9 17.00 | [TEAM LOGO] PHILADELPHIA PHILLIES |
| #10 16.00 | [TEAM LOGO] OREGON DUCKS | BALTIMORE RAVENS | #10 16.00 | [TEAM LOGO] SAN FRANCISCO GIANTS |

FIG.9

HOME/MY SPORTFOLIO

| PENDING ORDERS | SHARES | BUYERS | SELLERS | LAST | CURRENT MARKET | |
|---|---|---|---|---|---|---|
| BUY 5 SHARES AUBURN @ $20.00 | 5 | $20.00 | $23.00 | $10.00 | $24.00 | CANCEL |
| SELL 5 SHARES ARKANSAS @ $16.00 | 5 | $7.25 | $8.25 | $16.50 | $18.00 | CANCEL |
| BUY 55 SHARES NEVADA @ $9.25 | 15 | $9.25 | $20.00 | $9.25 | $12.00 | CANCEL |
| BUY 30 SHARES ALABAMA @ $7.75 | 30 | $22.00 | $22.75 | $22.00 | $9.00 | CANCEL |
| BUY 12 SHARES SOUTH CAROLINA @ $6.25 | 12 | $8.00 | $9.25 | $9.25 | $8.00 | CANCEL |
| BUY 15 SHARES TEXAS A&M @ $5.50 | 15 | $5.50 | $6.50 | $4.75 | $7.00 | CANCEL |
| SELL 5 SHARES TEXAS A&M @ $6.50 | 5 | $5.50 | $6.50 | $4.75 | $7.00 | CANCEL |
| BUY 10 SHARES FLORIDA ST. @ $4.25 | 10 | $4.25 | $10.00 | $10.00 | $6.00 | CANCEL |
| BUY 50 SHARES UTAH @ $3.00 | 50 | $3.00 | $18.00 | $17.25 | $5.00 | CANCEL |
| BUY 20 SHARES WEST VIRGINIA @ $1.75 | 20 | $1.75 | $2.50 | $0 | $3.00 | CANCEL |
| SHORT-10 SHARES WEST VIRGINIA @ $2.50 | -10 | $1.75 | $2.50 | $0 | $3.00 | CANCEL |
| BUY 25 SHARES NORTHERN ILLINOIS @ $1.00 | 25 | $1.00 | $1.75 | $0 | $2.00 | CANCEL |
| SHORT-5 SHARES NORTHERN ILLINOIS @ $1.75 | -5 | $1.00 | $1.75 | $0 | $2.00 | CANCEL |
| SHORT-50 SHARES HAWAII @ $1.00 | -50 | $0.50 | $1.00 | $0 | $1.00 | CANCEL |
| BUY 10 SHARES NEW ENGLAND PATRIOTS @ $21.00 | 10 | $21.25 | $22.75 | $21.50 | $25.00 | CANCEL |
| SHORT-10 SHARES BALTIMORE RAVENS @ $23.00 | -10 | $22.00 | $23.00 | $22.00 | $22.00 | CANCEL |
| BUY 5 SHARES PHILADELPHIA EAGLES @ $13.50 | 5 | $13.50 | $18.25 | $17.25 | $17.00 | CANCEL |
| BUY 10 SHARES NEW YORK GIANTS @ $19.00 | 10 | $19.00 | $20.25 | $20.25 | $12.00 | CANCEL |
| BUY 5 SHARES OAKLAND RAIDERS @ $4.25 | 5 | $4.25 | $10.00 | $2.00 | $5.00 | CANCEL |
| SHORT-10 SHARES SAN ANTONIO SPURS @ $22.00 | -10 | $17.50 | $22.00 | $18.75 | $25.00 | CANCEL |
| SHORT-23 SHARES UTAH JAZZ @ $18.00 | -23 | $15.00 | $18.00 | $16.25 | $20.00 | CANCEL |
| SELL 5 SHARES PHOENIX SUNS @ $18.00 | 5 | $15.50 | $18.00 | $16.25 | $12.00 | CANCEL |
| BUY 25 SHARES TORONTO RAPTORS @ $2.25 | 25 | $2.25 | $4.25 | $0 | $3.00 | CANCEL |

FIG.10a

| PORTFOLIO | | PLAY UNLIMITED SPORTS & TEAMS | EXCITING NEW GAME! RANKING DRILL | PLAY NOW |
|---|---|---|---|---|
| CAREER WIN-LOSS 0-0 | PORTFOLIO VALUE 556.25 | AVAILABLE CREDIT 9993.75 CREDITS | FREE UPGRADE | |
| NCAA FOOTBALL WIN -LOSS 0-0 | NCAA FOOTBALL SUBTOTAL 556.25 | NCAA FOOTBALL UNREALIZED GAIN/LOSS 0.00 | SPORTSGUNNER POINTS 0 | MAKE A PLAY |

| TEAM | YOUR PLAY | WINNING OR LOSING | ACTIONS | TOTAL SHARES | CURRENT RANK/PRICE | CURRENT VALUE | PURCHASE RANK/PRICE | PURCHASE VALUE | % CHANGE | PROFIT/LOSS |
|---|---|---|---|---|---|---|---|---|---|---|
| UCLA BRUINS | △ | W | | 25 | NR/0.25 | 6.25 | NR/0.25 | 6.25 | 0.00 | 0.00 |
| USC TROJANS | ▽ | W | | 25 | 4/22.00 | 550.00 | 4/22.00 | 550.00 | 0.00 | 0.00 |

PORTFOLIO

| PORTFOLIO | |
|---|---|
| POSITIONS | $0.00 |
| AVAILABLE CASH | $747.50 |
| TOTAL VALUE | $747.50 |

| CASH DETAIL | | CURRENT GAIN/LOSS |
|---|---|---|
| TOTAL CASH | 1,000.00 | 0.00 |
| RESERVE | 0.00 | |
| OPEN ORDERS | 252.50 | |

NFL FOOTBALL    CURRENT VALUE:0.00    RESERVE:0.00    CURRENT PROFIT/LOSS:0.00

OPEN TRADES    CURRENT VALUE:0.00

| TEAM | ACTIONS | TYPE | SHARES | OFFER PRICE | OFFER VALUE | CURRENT PRICE | CURRENT VALUE | EXPIRATION VALUE | DIFFERENCE |
|---|---|---|---|---|---|---|---|---|---|
| [TEAM LOGO] PITTSBURGH STEELERS (5-2) vs BALTIMORE RAVENS | TRADE | BUY | 10 | 10.00 | 100.00 | BUY-10.00 SELL-0.00 LAST-0.00 CHANGE-+0% | 0.00 | 210.00 RANK-5 PRICE-21.00 | -100.00 -100.00% |
| [TEAM LOGO] (4-2) vs NEW YORK JETS | TRADE | BUY | 10 | 15.00 | 150.00 | BUY-15.00 SELL-0.00 LAST-0.00 CHANGE-+0% | 0.00 | 190.00 RANK-7 PRICE-19.00 | -150.00 -100.00% |

FIG.10c

| | SCORE | QTR | PRICE | |
|---|---|---|---|---|
| | | | BID | ASK |
| UCLA | 14 | 3RD | 20.40 | 21.70 |
| USC | 21 | 9:48 | 23.80 | 24.10 |

......BOS U 15@11.00..........UT 10@5.00..........CONN 50@14.00..........TENN 30@25.00......

*FIG.11a*

| | | | |
|---|---|---|---|
| #1 25.00 CREDITS PER SHARE | TEAM LOGO FLORIDA GATORS | TEAM LOGO (7-0) NEXT VRS. UAB BLAZERS SEP.10,2011 | PREDICTION UP DOWN |
| #2 24.00 CREDITS PER SHARE | TEAM LOGO ALABAMA CRIMSON TIDE | TEAM LOGO (8-0) NEXT VRS. NORTH TEXAS MEAN GREEN SEP.17,2011 | PREDICTION UP DOWN |
| #3 23.00 CREDITS PER SHARE | TEAM LOGO TEXAS LONGHORNS | TEAM LOGO (7-0) NEXT VRS. UAB BLAZERS SEP.10,2011 | PREDICTION UP DOWN |
| #4 22.00 CREDITS PER SHARE | TEAM LOGO USC TROJANS | TEAM LOGO (6-1) NEXT VRS. JAN.1,2000 | PREDICTION UP DOWN |
| #5 21.00 CREDITS PER SHARE | TEAM LOGO CINCINNATI BEARCATS | TEAM LOGO (7-0) NEXT VRS. TENNESSEE VOLUNTEERS SEP.10,2011 | PREDICTION UP DOWN |
| #6 20.00 CREDITS PER SHARE | TEAM LOGO BOISE ST. BRONCOS | TEAM LOGO (7-0) NEXT VRS. JAN.1,2000 | PREDICTION UP DOWN |
| #7 19.00 CREDITS PER SHARE | TEAM LOGO IOWA HAWKEYES | TEAM LOGO (8-0) NEXT VRS. PITTSBURGH PANTHERS SEP.17,2011 | PREDICTION UP DOWN |
| #8 18.00 CREDITS PER SHARE | TEAM LOGO TCU HORNED FROGS | TEAM LOGO (7-0) NEXT VRS. BAYLOR BEARS SEP.2,2011 | PREDICTION UP DOWN |
| #9 17.00 CREDITS PER SHARE | TEAM LOGO LSU TIGERS | TEAM LOGO (6-1) NEXT VRS. OREGON DUCKS SEP.9,2011 | PREDICTION UP DOWN |

*FIG.11b*

| RANK | EXP. VALUE | TEAM | RECORD NEXT GAME | BUY AT | SELL AT | | LAST | CHANGE |
|---|---|---|---|---|---|---|---|---|
| #1 | 25.00 | GREEN BAY PACKERS | (W) (7-0)@ SAN DIEGO CHARGERS | $0.00 | $2.00 | BUY / SELL | 0.00 | +0% |
| #2 | 24.00 | NEW ENGLAND PATRIOTS | (W) (5-1)vs NEW YORK GIANTS | $0.00 | $5.00 | BUY / SELL | 0.00 | +0% |
| #3 | 23.00 | NEW ORLEANS SAINTS | (W) (5-2)vs TAMP BAY BUCCANEERS | $0.00 | $0.00 | BUY / SELL | 0.00 | +0% |
| #4 | 22.00 | SAN FRANCISCO 49ers | (W) (5-1)@ WASHINGTON REDSKINS | $0.00 | $0.00 | BUY / SELL | 0.00 | +0% |
| #5 | 21.00 | PITTSBURGH STEELERS | (W) (5-2)vs BALTIMORE RAVENS | $0.00 | $10.00 | BUY / SELL | 0.00 | +0% |
| #6 | 20.00 | BALTIMORE RAVENS | (W) (4-2)@ PITTSBURGH STEELERS | $0.00 | $0.00 | BUY / SELL | 0.00 | +0% |
| #7 | 19.00 | BUFFALO BILLS | (W) (4-2)VS NEW YORK JETS | $0.00 | $15.00 | BUY / SELL | 0.00 | +0% |
| #8 | 18.00 | DETRIOT LIONS | (W) (5-2)@ CHICAGO BEARS | $0.00 | $0.00 | BUY / SELL | 0.00 | +0% |
| #9 | 17.00 | SAN DIEGO CHARGERS | (W) (4-2)vs GREEN BAY PACKERS | $0.00 | $0.00 | BUY / SELL | 0.00 | +0% |
| #10 | 16.00 | CHICAGO BEARS | (W) (4-3)@ PHILADELPHIA EAGLES | $0.00 | $0.00 | BUY / SELL | 0.00 | +0% |
| #11 | 15.00 | NEW YORK GIANTS | (W) (4-2)@ NEW ENGLAND PATRIOTS | $0.00 | $0.00 | BUY / SELL | 0.00 | +0% |

FIG. 15

HOME/PROFILE/WITHDRAW FUNDS

WITHDRAW FUNDS

CURRENT BALANCE    $14,294.75

ACCOUNT    ○ CREDIT CARD – – CREDIT CARD – –
           ○ BANK ACCOUNT– WACHOVIA– JORDAN WALLENS
             BANK ACCOUNT– WACHOVIA– JORDAN WALLENS

AMOUNT [           ] USD

[WITHDRAW]

TRADE CENTER ACTIVITY FEED

JULY 25, 2011

ACTIVITY FEED 

| | |
|---|---|
| CRAIG WILKENING | MADE A PLAY FOR SAN FRANCISCO GIANTS |
| CRAIG WILKENING | MADE A PLAY FOR PHILADELPHIA PHILLIES |
| CRAIG WILKENING | MADE A PLAY FOR CINCINNATI REDS |
| VINCENT ROCO | CASHED OUT BOSTON RED SOX |
| CRAIG WILKENING | CASHED OUT OKLAHOMA ST. COWBOYS |
| CRAIG WILKENING | CASHED OUT PHILADELPHIA EAGLES |
| SAMANTHA STEINWINDER | MADE A PLAY FOR TEXAS RANGERS |
| SARA BALL | MADE A PLAY FOR NEW YORK YANKEES |
| SAMANTHA STEINWINDER | CONFIRMED SARA BALL AS FRIEND |
| LUKE ONEIL | CONFIRMED SAMANTHA STEINWINDER AS FRIEND |
| KEVIN SINTUMUANG | CONFIRMED SAMANTHA STEINWINDER AS FRIEND |
| KEVIN SINTUMUANG | CONFIRMED VINCENT ROCO AS FRIEND |
| LUKE ONEIL | CONFIRMED VINCENT ROCO AS FRIEND |
| LUKE ONEIL | JUST RECEIVED ALPHA AWARD |

FIG.20

MY FRIENDS

1  CHARLES BREWER 1000.00
2  VINCENT ROCO 900.00
3  SAMANTHA STEINWINDER 0.00

SPORTSGUNNER NATION

1  DAMIEN RICHARDS 86435.00
2  TOMMY O'GORMAN 27500.00
3  BEN WEINRIB 25000.00
4  ADAM BLOOD 23117.50
5  JASON TUNNER 14500.00
6  JONATHON MAEL 2437.50
7  NATHAN RYAN 1350.00
8  MARK WALLIS 1070.00
9  CHARLES BREWER 1000.00
10  VINCENT ROCO 900.00

FIG.21

| | NCAA FOOTBALL | | | |
|---|---|---|---|---|
| | NFL FOOTBALL | WEST | NORTH | |
| | MLB BASEBALL | | EAST | |
| | | | SOUTH | |
| | | CITY: SELECT A CITY | | |

| SPORTSGUNNER POINTS EARNED | BIGGEST PORTFOLIO | THIS WEEK |
| SPORTSGUNNER POINTS% INCREASE | MOST WINS | THIS MONTH |
| MOST SPORTSGUNNER POINTS | MOST TRADES | THIS SEASON |
| | | ALL TIME |

HALL OF CHAMPIONS

| | FIRST NAME | LAST NAME | SCREEN NAME | SCORE |
|---|---|---|---|---|
| IMAGE | JOHN D. | "BUCKLY" | SMITH | 23,904 |
| IMAGE | BOBBY | "THE GREEN ARROW" | AROMA | 23,450 |
| IMAGE | LINOW | "BOW" | TIE | 23,120 |

FIG.22

| | | | | | |
|---|---|---|---|---|---|
| #1 | TEAM LOGO | GREEN BAY PACKERS | UP | NO CHANGE | DOWN |
| #2 | TEAM LOGO | NEW ENGLAND PATRIOTS | UP | NO CHANGE | DOWN |
| #3 | TEAM LOGO | PHILADELPHIA EAGLES | UP | NO CHANGE | DOWN |
| #4 | TEAM LOGO | PITTSBURGH STEELERS | UP | NO CHANGE | DOWN |
| #5 | TEAM LOGO | NEW ORLEANS SAINTS | UP | NO CHANGE | DOWN |
| #6 | TEAM LOGO | NEW YORK JETS | UP | NO CHANGE | DOWN |
| #7 | TEAM LOGO | ALANTA FALCONS | UP | NO CHANGE | DOWN |
| #8 | TEAM LOGO | INDIANAPOLIS COLTS | UP | NO CHANGE | DOWN |
| #9 | TEAM LOGO | BALTIMORE RAVENS | UP | NO CHANGE | DOWN |
| #10 | TEAM LOGO | SAN DIEGO CHARGERS | UP | NO CHANGE | DOWN |
| #11 | TEAM LOGO | NEW YORK GIANTS | UP | NO CHANGE | DOWN |
| #12 | TEAM LOGO | CHICAGO BEARS | UP | NO CHANGE | DOWN |
| #13 | TEAM LOGO | DALLAS COWBOYS | UP | NO CHANGE | DOWN |
| #14 | TEAM LOGO | TAMPA BAY BUCCANEERS | UP | NO CHANGE | DOWN |
| #15 | TEAM LOGO | ST. LOUIS RAMS | UP | NO CHANGE | DOWN |

2 MINUTE DRILL

FIG. 23

MY LEAGUES

[START A PICKUP LEAGUE] [PLAY PICKUP] SHOW EXPIRED ☐

| | LEAGUE NAME | ACTIONS | CURRENT LEADER | | MY RANK | BUY-IN | STAKES | START | END |
|---|---|---|---|---|---|---|---|---|---|
| IMAGE | SEA VENTURE | DETAILS | IMAGE | BAMBAM "THE QUICK" BAUTISTA | 2 | $600 | $10,000 | 9/10/11 | 2/11/12 |
| IMAGE | PLAY TECHNICIANS INC | DETAILS | IMAGE | JOHN "DORK" SMITH | 14 | $500 | $6,000 | 9/20/11 | 1/9/12 |
| IMAGE | THE VELOCITY | DETAILS | IMAGE | AUSTIN "WANDY" VAUGH | 12 | $1,000 | $11,000 | 9/13/11 | 8/12/12 |
| IMAGE | CAPITAL REVERSERS | DETAILS | IMAGE | JOHNNY "THE BEAVER" BATUGAS | 2 | $500 | $50,000 | 9/11/11 | 2/19/12 |

FIG.24

MOST RECENT OPEN ORDERS

| | | | | | | |
|---|---|---|---|---|---|---|
| #5 $21.00 | [TEAM LOGO] | PITTSBURGH STEELERS | BUY 10 SHARES @ $10.00 | LAST:0.00 +0% | [SELL] |
| #7 $19.00 | [TEAM LOGO] | BUFFALO BILLS | SELL 10 SHARES @ $21.00 | LAST:0.00 +0% | [BUY] |
| #2 $24.00 | [TEAM LOGO] | NEW ENGLAND PATRIOTS | BUY 10 SHARES @ $1.00 | LAST:0.00 +0% | [SELL] |
| #2 $24.00 | [TEAM LOGO] | NEW ENGLAND PATRIOTS | BUY 10 SHARES @ $5.00 | LAST:0.00 +0% | [SELL] |
| #1 $25.00 | [TEAM LOGO] | GREEN BAY PACKERS | BUY 5 SHARES @ $1.00 | LAST:0.00 +0% | [SELL] |
| #1 $25.00 | [TEAM LOGO] | GREEN BAY PACKERS | BUY 10 SHARES @ $2.00 | LAST:0.00 +0% | [SELL] |

[MORE...]

SYSTEM AND METHOD FOR OPERATING A COMPETITIVE SPORTS MARKET BASED ON RANKING

CROSS-REFERENCE TO RELATED APPLICATIONS

This non-provisional application claims the benefit of U.S. Provisional Patent Application No. 61/452,554, filed in the U.S. Patent and Trademark Office on Mar. 14, 2011.

BACKGROUND

In the field of economic markets, participants in a market are able to trade shares in a variety of different goods. For example, participants in the NYSE and NASDAQ stock markets use computer systems to buy and sell shares of public corporations.

As another example, participants in prediction markets (such as the Intrade™ prediction markets) can trade "shares" in whether various events such as whether a particular film will win the Academy Award® for Best Picture or whether a particular political candidate will win an upcoming election. Owners of these shares are paid if their predictions are turn out to be correct. For example, in a race between Candidate A and Candidate B in which each share would pay out $10 to the shareholder once the election was decided, the share prices for Candidates A and B would vary over the course of their election campaigns based on the market participants' perceptions of the probability that either candidate would win the election. Participants would buy and sell shares based on mismatches between their value and the current market values until such issues were resolved.

In a way similar to that of electronic stock markets, prediction markets are typically also built and run on computer systems which manage the orders placed by the participants and operate to execute the trades.

SUMMARY

Embodiments of the present invention are directed to a system and method for operating a market in competitive sports based on ranking.

According to one embodiment of the present invention, a computer system for providing a market for a plurality of participants to invest in a plurality of shares of corresponding competitors includes: a central processing unit; memory coupled to the central processing unit; a data bus coupled to the central processing unit; a persistent storage device coupled to the data bus; and a network interface device coupled to the data bus, the computer system being configured to: store a plurality of share holdings of the participants; store a plurality of credit balances of the participants; and redeem shares at the conclusion of a period, wherein the computer system is configured to redeem shares by calculating an amount that the credit balance of each participant should be modified in accordance with a plurality of values of corresponding ones of the shares at the conclusion of the period and the share holdings of a corresponding participant of the participants, and wherein the values of the shares at the conclusion of the period is determined based on a benchmark ranking of the competitors at the conclusion of the period.

The values of the shares corresponding to a highest ranked competitor of the benchmark ranking may be greater than the values of the shares corresponding to a lowest ranked competitor of the benchmark ranking.

The value of the shares associated with a competitor of the competitors may decrease linearly with the decreasing rank of the competitor in the benchmark ranking.

The competitors may be sports teams.

The benchmark ranking may be a poll.

The competitors may be individual athletes.

The system may be further configured to: accept a plurality of orders from participants to buy shares and to sell shares; complete the orders to trade shares by matching the orders to buy shares with the orders to sell shares; and modify the share holdings and the credit balances of participants in accordance with the completed orders.

The market may be a pari-mutuel market.

The system may be further configured to: accept a plurality of orders from participants to buy shares and to sell shares; complete the orders to trade shares by issuing shares when completing an order to buy shares and by buying back shares when completing an order to sell shares; and modify the share holdings and the credit balances of the participants in accordance with the orders.

According to another embodiment of the present invention, a method of operating a market for a plurality of participants to invest in a plurality of competitors using a computer system includes: storing a plurality of share holdings of the participants in the computer system; storing a plurality of credit balances of the participants in the computer system; and redeeming shares at the conclusion of a period in the computer system, wherein redeeming shares includes: calculating an amount that the credit balance of each corresponding participant of the participants should be modified in accordance with a plurality of values of corresponding ones of the shares at the conclusion of the period and the share holdings of the corresponding participant, and determining the values of the shares based on a benchmark ranking of the competitors at the conclusion of the period.

BRIEF DESCRIPTION OF THE DRAWINGS

The accompanying drawings, together with the specification, illustrate exemplary embodiments of the present invention, and, together with the description, serve to explain the principles of the present invention.

FIG. 4 is a screenshot illustrating a user interface for adding a bank account to a participant's user account according to one embodiment of the present invention.

FIG. 5 is a screenshot illustrating a user interface for adding credits to a participant's user account using a credit card according to one embodiment of the present invention.

FIG. 6 is a screenshot illustrating a user interface for adding a funds to a participant's user account using a credit card or bank account according to one embodiment of the present invention.

FIG. 7 is a screenshot of an order input user interface according to one embodiment of the present invention.

FIG. 8 is a screenshot of a portion of the user interface which provides an overview of current SportShares prices according to one embodiment of the present invention.

FIG. 9 is a screenshot listing a participant's pending orders according to one embodiment of the present invention.

FIG. 10*a* is a screenshot illustrating a participant's portfolio of shares according to one embodiment of the present invention.

FIG. 10*b* is a screenshot illustrating a participant's portfolio of shares according to another embodiment of the present invention.

FIG. 10*c* is a screenshot illustrating a scoreboard showing a game in progress with current prices according to one embodiment of the present invention.

FIG. 11*a* is a screenshot of a ranking of teams along with links for a participant to purchase or sell SportShares in those teams according to one embodiment of the present invention.

FIG. 11*b* is a screenshot of a ranking of teams along with links for a participant to purchase or sell SportShares in those teams according to another embodiment of the present invention.

FIG. 15 is a screenshot illustrating a component of the user interface of embodiments of the present invention which allows a participant to withdraw cash funds from his account.

FIG. 17 is a screenshot of a user interface according to one embodiment of the present invention for searching for other participants to add or connect to as "friends".

FIG. 18 is a screenshot of a user interface according to one embodiment of the present invention of a user interface listing "friends and rivals" that a participant is associated with.

FIG. 19 is a screenshot of an activity feed according to one embodiment of the present invention.

FIG. 20 is a screenshot of leaderboards which show current ranks of participants based on point totals may be displayed according to one embodiment of the present invention.

FIG. 21 is a screenshot of leaderboards which may be customized based on aspects such as sport, region, time period, and ranking criteria.

FIG. 22 is a screenshot illustrating an interface for inputting predictions according to one embodiment of the present invention.

FIG. 23 is a screenshot illustrating an interface for managing membership in and status of competitive "leagues" according to one embodiment of the present invention.

FIG. 24 is a screenshot illustrating most recent open orders according to one embodiment of the present invention.

DETAILED DESCRIPTION

Figure 1:
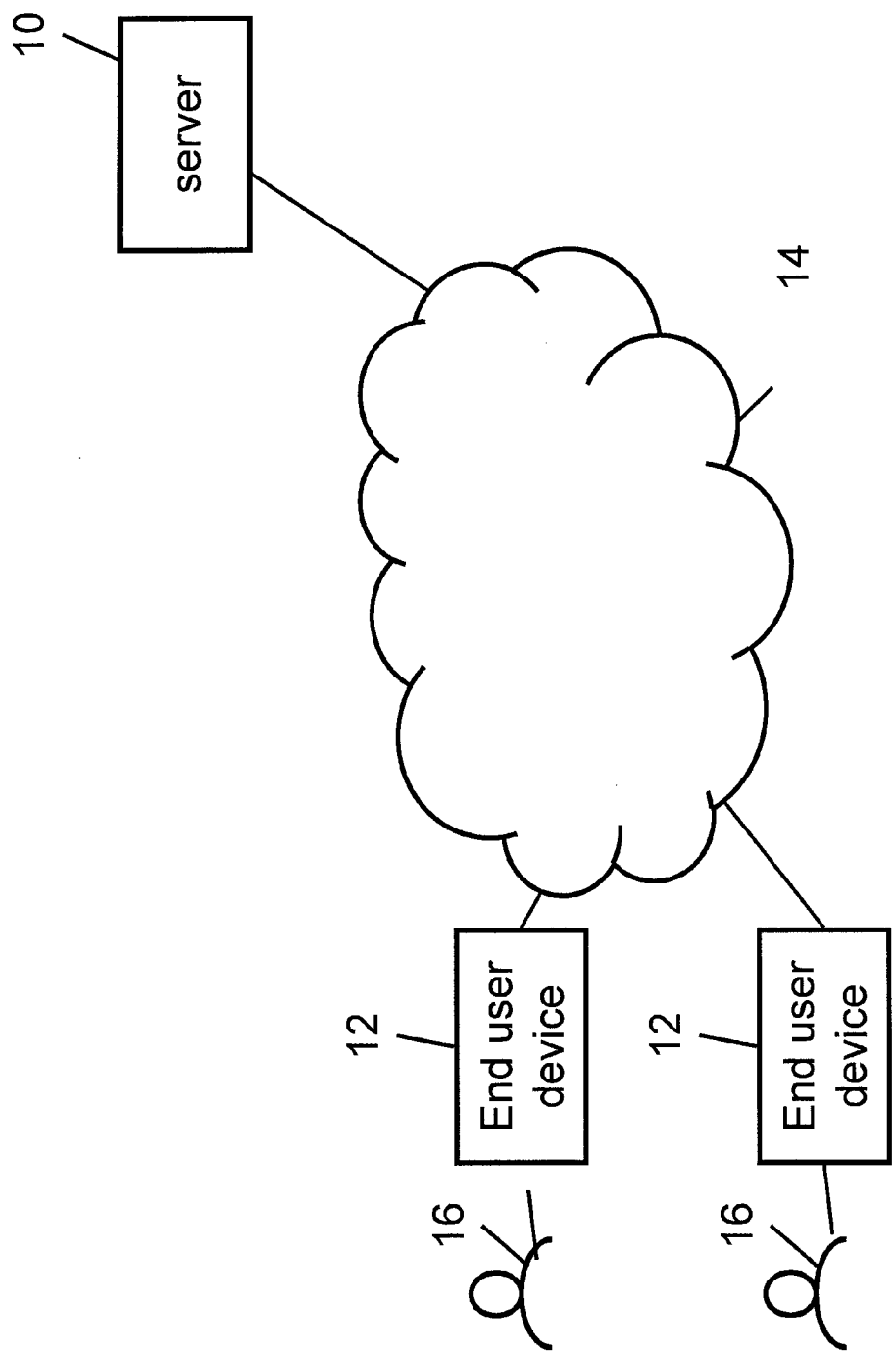
FIG. 1 is a system block diagram illustrating a system for operating a competitive sports market based on ranking according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed toward a system for an online and mobile phone application for pari-mutuel trading and investing in "SportShares" of teams, the final (or redemption) value of the shares being based on the poll rankings of sports (or athletic) teams at the end of the season. Embodiments of the present invention use polls or rankings to determine value, rather than individual contests and therefore focus on investing, not wagering.

For example, embodiments of the present invention may use the official pre-season, weekly, and the annual season-ending, Associated Press® (AP) Top 25 poll, to determine the net present and future expiration value of each sports team in the competition.

Embodiments of the present invention are directed to the use of any poll or ranking to value any team in any sport. For example, rankings from the Associated Press®, ESPN®, Sports Illustrated®, and other news organizations or official rankings such as the NASCAR® Sprint Cup Series® Standings, Association of Tennis Professionals® (ATP), Women's Tennis Association® (WTA), Professional Golfers' Association® (PGA), and other professional sports associations' rankings may be used as the ranking for determining the value of a team or player in a sport within a pari-mutuel trading and investing system according to embodiments of the present invention. For non-revenue college sports, an appropriate sport-specific poll, e.g., Baseball America or Hockey News, may be used to determine the values of the teams for that sport.

For example, in a season-end poll in which 25 teams are ranked, SportShares of the team that finishes the sports season ranked #1 in their sport's respective AP (or other benchmark ranking) Top 25 poll will expire worth $25 (or other dollar value related to the number of teams that appear in the benchmark poll). The second place finisher will expire worth $24, the third place $23, etc. The 25th ranked team in each season's final poll will expire worth $1. If a given sport ranks only 20 teams, then the champion will expire worth $20.

More generally, in a benchmark poll that ranks N teams, each SportShare of the #1 ranked team will be worth (or redeemed at) $N, each share of the #2 ranked team will be worth $N−1, and so on, with shares of the Nth ranked team being worth $1. In other embodiments of the present invention, the relationship between the rankings and redemption value of the shares may be different. For example, in some embodiments, the payouts may be made with different scaling factors, such as shares of the #1 ranked team being worth $N/100 or the payouts may monotonically (e.g., linearly, polynomially, or exponentially) decrease as a function of rank.

In some embodiments, the values refer to credits or "play money" which do not directly correspond to any monetary value, while in other embodiments, the values correspond to actual funds that exchange hands between participants and the system. In some embodiments of the present invention, players are initially issued a set number of credits and can purchase additional credits from the system for a fee.

According to one embodiment, SportShares of teams that fail to earn a Top 25 ranking in the season ending benchmark poll expire worthless (e.g., a redemption value of $0). In other embodiments, the number of teams ranked is greater than or less than 25.

For example, the University of Alabama Crimson Tide football team finished the 2009-10 season ranked #1 in the Associated Press Top 25 poll. Therefore, Alabama's SportShares expired at $25 per share. The number 10 ranked team in the poll expired at $16 per share. SportShares in Oklahoma State, which did not make the Top 25 poll, expired at $0 per share.

Between the pre-season poll and the final season-ending poll in any given sport, the values of the teams' SportShares will fluctuate based on the market's (e.g., the market participants') predictions and valuations of each team's prospects for achieving a given final ranking (e.g., the team's expected final ranking).

In addition, in some embodiments of the present invention, the values of the teams' SportShares may fluctuate based on the results of other polls released between the pre-season poll and the final season-ending poll. In one embodiment of the present invention, the participants do not trade SportShares with one another and instead trade with the system, and the value of a team's SportShares depends only on the team's current ranking as determined, for example, by a weekly mid-season poll.

FIG. 1 is an functional diagram illustrating a system according to one embodiment of the present invention. As shown in FIG. 1, participating investors 16 access an application or website (which may be referred to as the "SportShares application") running on server 10 over a network 14 via an application or a web browser, either of which may run on an end user device 12, which may be a mobile device (such as a mobile phone, a tablet, or a laptop), a computer, or other communications devices as are well known in the art. The network 14 may include the internet, a local area network, cellular telephone networks, satellite networks, and combinations thereof, as are well known in the art for communicating digital information.

Figure 2:
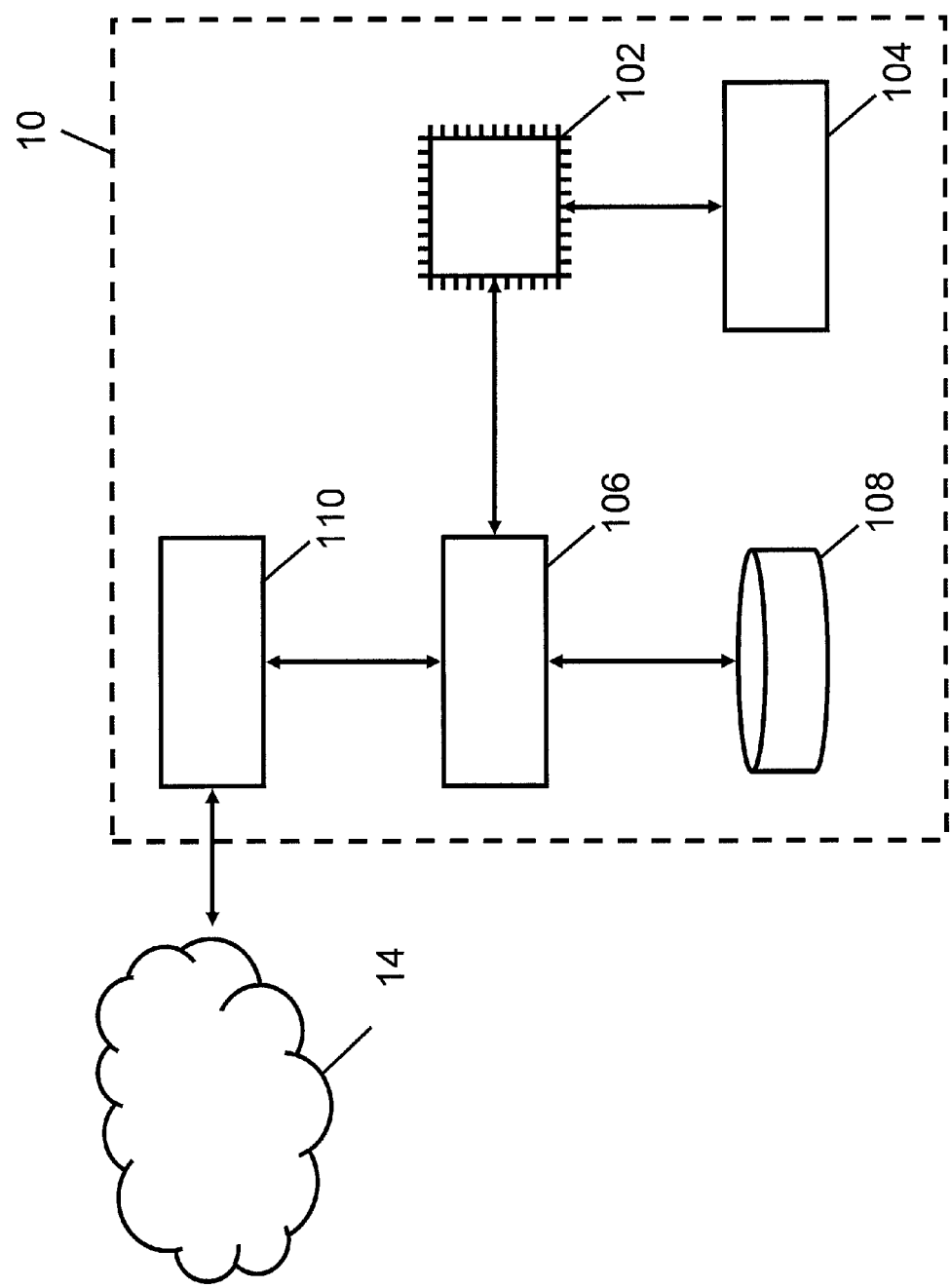
FIG. 2 is a block diagram of a computer system which may be used to operate a competitive sports market according to one embodiment of the present invention.

FIG. 2 is a block diagram illustrating components of a computer system which may be used to run the SportShares application. Referring to FIG. 2, according to one embodiment of the present invention, a server 10 includes a central processing unit (CPU) 102, memory 104 for storing data and program instructions (e.g., program instructions related to the SportShares application), a data bus 106 for the CPU to communicate with peripheral devices, a persistent storage device 108 (such as a hard disk drive, a solid state drive, other flash memory) for storing participant data (e.g., in a database structure), and a network interface device 110 for communicating with other computers. Other embodiments of the present invention may use computer systems having different architectures or different arrangements of components.

In other embodiments of the present invention, the SportShares application may run on a plurality of servers configured to perform similar functions or different functions. For example, a plurality of servers may each run substantially the same software and each server may manage both the user interface and data storage (e.g., in a database) for the SportShares application, with participants directed to particular servers by a load balancing server. As another example, a first server (or a plurality of servers) may be dedicated to providing participant interaction and a second server (or a plurality of servers) may be dedicated to data storage.

Figure 3:
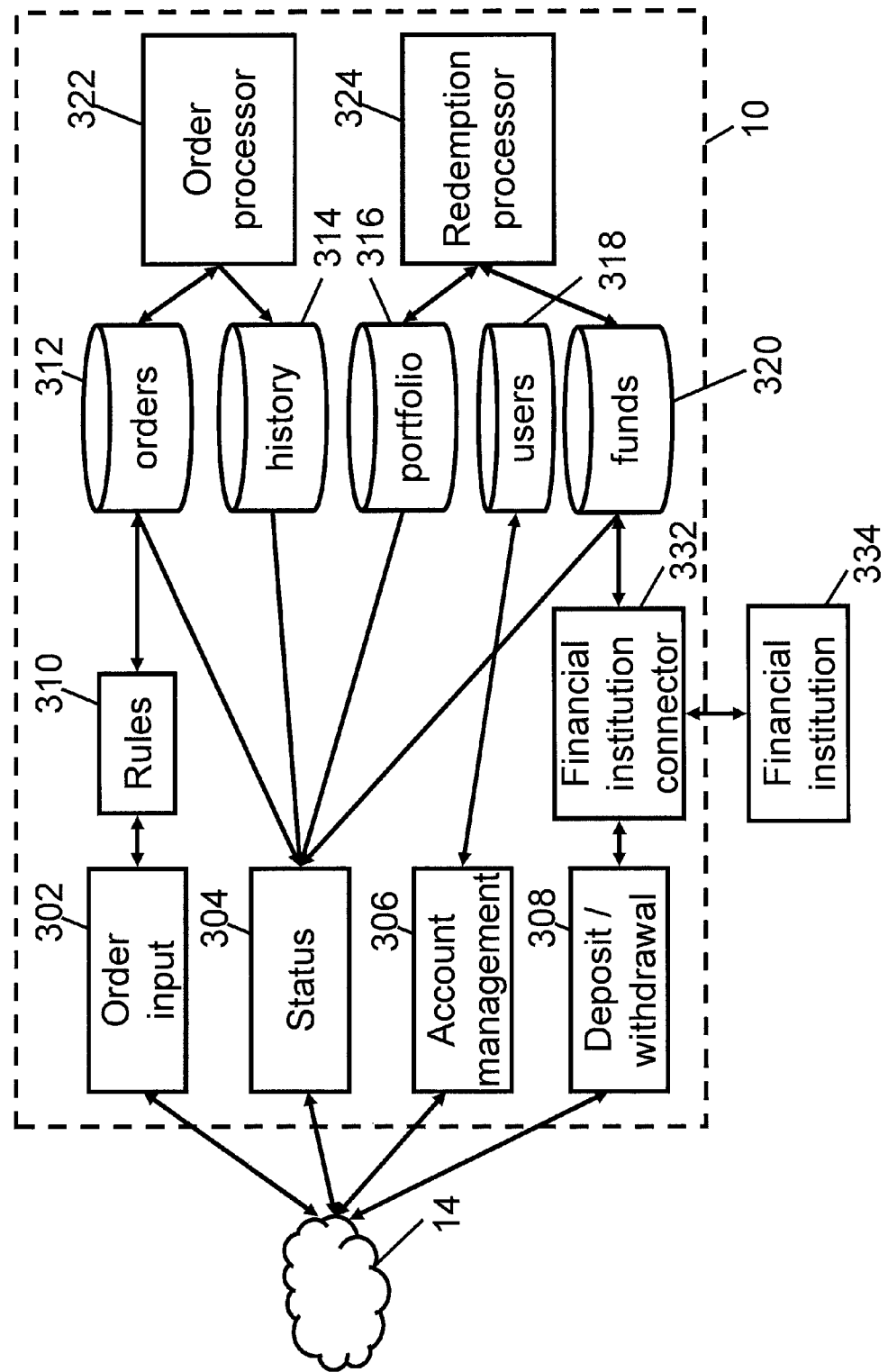
FIG. 3 is a functional block diagram of a system configured to operate a competitive sports market according to one embodiment of the present invention.

FIG. 3 is a functional block diagram illustrating components of the SportShares application. In one embodiment, these components may be implemented in software running on the server 10. The software may be built on a variety of operating systems and software platforms that are well known in the art such as a Linux, Apache HTTP server, MySQL database, and PHP (LAMP) stack or similar systems built on other operating systems (e.g., Windows, BSD, OS X, etc.) with different web server software (e.g., Microsoft™ Internet Information Services), different database software (e.g., PostgreSQL, Microsoft™ SQL Server, Oracle™ RDBMS, etc.) and different scripting languages (e.g., JavaServer Pages, Perl, Python, etc.).

In one embodiment of the present invention, a participant signs up for an account to obtain a username and a password (e.g., via an account management interface and storing the username and a hash of the password in the users database 318), and, once issued a username and password, participants can log in to the system and open and fund their SportShares investment and trading accounts (e.g., via a deposit/withdrawal interface 308). FIGS. 4, 5, and 6 are screenshots illustrating a user interface for adding credits to the participant account using a bank account, credit card, and other funds, respectively. In some embodiments, the SportShares investment and trading accounts are initially funded with a limited supply of "free" credits. In some embodiments of the present invention, commissions may be charged for the execution of trades. In some embodiments of the present invention, a basic membership is free and accelerated subscription packages which may provide access to additional information (e.g., real-time quotes, more extensive charts and analysis, increased integration with news feeds) may be available for an additional fee.

Once the account is opened and funded, participants can buy, sell, and trade SportShares via the application or website in a pari-mutuel manner with other participants, which may include friends, investment groups, and strangers. As described above, in other embodiments of the present invention, participants buy and sell SportShares directly from the SportShares application (e.g., shares issued or bought back by the SportShares application, without interaction with other participants) at prices determined by the most recent poll rankings. Orders may be placed via the order input interface 302. FIG. 7 is a screenshot of an order input user interface according to one embodiment of the present invention.

Customers can also post and leave open buy/sell trading orders on different teams' Sport Shares to be transacted later, with another participant, if or when the proposer's/acceptor's bid/ask price is met, whereupon a trade notice is transmitted to each participant in that particular transaction, and their trading accounts are debited and credited accordingly.

Participants can "go long" (i.e., buy SportShares) or "sell short" (i.e., sell SportShares that they do not own). The current share price will be determined by the equilibrium between the Bid price, i.e., those traders looking to buy a given SportShare at the market's highest price offer, and the Ask price, or the lowest price at which traders are looking to sell SportShares in a given team are willing to sell their shares. FIG. 8 is a screenshot of a portion of the user interface which provides an overview of current SportShares prices according to one embodiment of the present invention.

After a participant has entered an order into the SportShares application, a rules verifier 310 (see, e.g., FIG. 3) checks to determine if the order complies with particular rules. For example, when buying SportShares, the rules verifier 310 may determine if the participant has enough cash in his account to purchase the desired shares at the requested price or, when selling SportShares, the rules verifier 310 may ensure that the participant has enough shares in his portfolio (or enough cash in his account when short selling) to cover the sale.

If the order is rejected by the rules verifier 310, the participant is presented with a request to correct the order to make it compliant with the rules enforced by the rules verifier 310 or to cancel the order. Once an order is accepted, the order is entered into the orders database 312 while it waits for processing by the order processor 322. FIG. 9 is a screenshot listing a participant's pending orders, according to one embodiment of the present invention, which may be viewed via a status user interface 304.

When a participant buys SportShares of a given team, the participant's trading account is deducted the amount of the purchase price multiplied by the number of shares traded in a manner similar to that of trading stock in public corporations. FIG. 10a is a screenshot illustrating a participant's portfolio of shares according to one embodiment of the present invention in which shares are traded for points. FIG. 10b is a screenshot illustrating a participant's portfolio of shares according to another embodiment of the present invention in which shares are traded (e.g., bought "long" or sold "short" for deposited cash).

FIG. 10c is a screenshot illustrating a scoreboard showing a game in progress with current prices according to one embodiment of the present invention. Over the course of the game, live, current game scores and time remaining in the game (if applicable) may be shown alongside prices of shares in the competitors involved in the game. The market prices (e.g., bid/ask prices) of the teams may fluctuate in real-time based on the performance of the teams as participants change their valuations of those teams and modify their orders to increase or decrease their bid or ask prices. In addition, a running stream (similar to a stock ticker) of recently completed trades (e.g., UCLA 10 shares @ $14.50) may also be provided in real-time. Such a ticker may be displayed in, for example, a browser or in a mobile application. For example, FIG. 10c also illustrates a running ticker below the scoreboard. However, the ticker may also be displayed in other portions of the application, such as on a trading (or order placement) page, on an initial landing page, and on a pending orders page.

When a participant sells SportShares, the participant's account is credited with the sale price multiplied by the number of shares, but the seller's account is deducted for credit authorization purposes, the dollar difference between the agreed upon trade price and $25 (i.e., the figure of maximum risk) or whatever the corresponding value minus the sale price of the benchmark poll for that sport. This keeps any participant from selling more shares that they are able or willing to honor, as each seller is (temporarily) deducted the full exposure risk amount of the trade, worst-case assuming the sold SportShares expire with the corresponding team in first place (e.g., worth $25 per share).

In one embodiment, the SportShares are traded in a "parimutuel" marketplace, in which a participant can only Buy or Sell as many shares as the participant is able to convince other participants to Sell or Buy. Therefore, orders may only be partially filled based on supply and demand and prices may have to be adjusted to complete an order. In other words, participants may "issue" shares by selling short and those shares may be traded among the other participants.

In another embodiment, the SportShares are traded solely with the SportShares application (e.g., with the SportShares service), which may buy and sell shares based on rankings as determined by the current polls (e.g., a weekly mid-season poll or ranking), the prices being based on the mid-season ranking in substantially the same way that prices are determined at the end of the season based on the post-season ranking.

Figure 12:
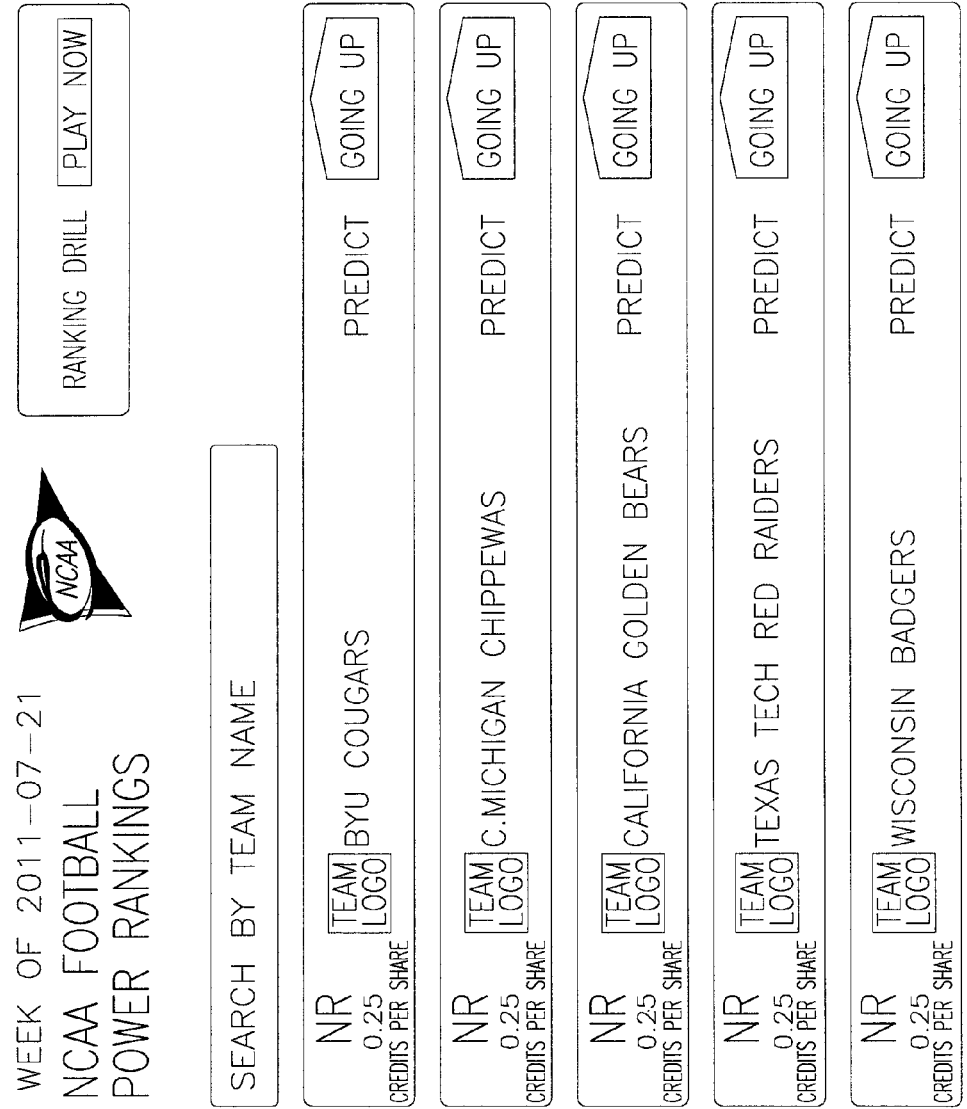
FIG. 12 is a screenshot showing unranked teams with links to allow a participant to purchase SportShares in those teams according to one embodiment of the present invention.

In one embodiment, at the end of the season, the benchmark Top 25 poll (or post-season ranking) determines the official expiration price of each team's respective SportShares. $25 for #1, $1 for #25, and all positions in between. Participants' accounts are credited and debited accordingly by the redemption processor 324 based on the contents of the participants portfolios (which are stored in the portfolio database 316). In some embodiments, the subsequent SportShares season begins the day following the end of the previous season (e.g., the day the benchmark poll is released). FIG. 11a is a screenshot of a ranking of teams along with links for a participant to purchase or sell SportShares in those teams according to one embodiment of the present invention in which SportShares are traded for points. FIG. 11b is a screenshot of a ranking of teams along with links for a participant to purchase or sell SportShares in those teams according to one embodiment of the present invention in which SportShares are traded for cash. FIG. 12 is a screenshot showing unranked teams with links to allow a participant to purchase SportShares in those unranked teams according to one embodiment of the present invention.

Figure 13:
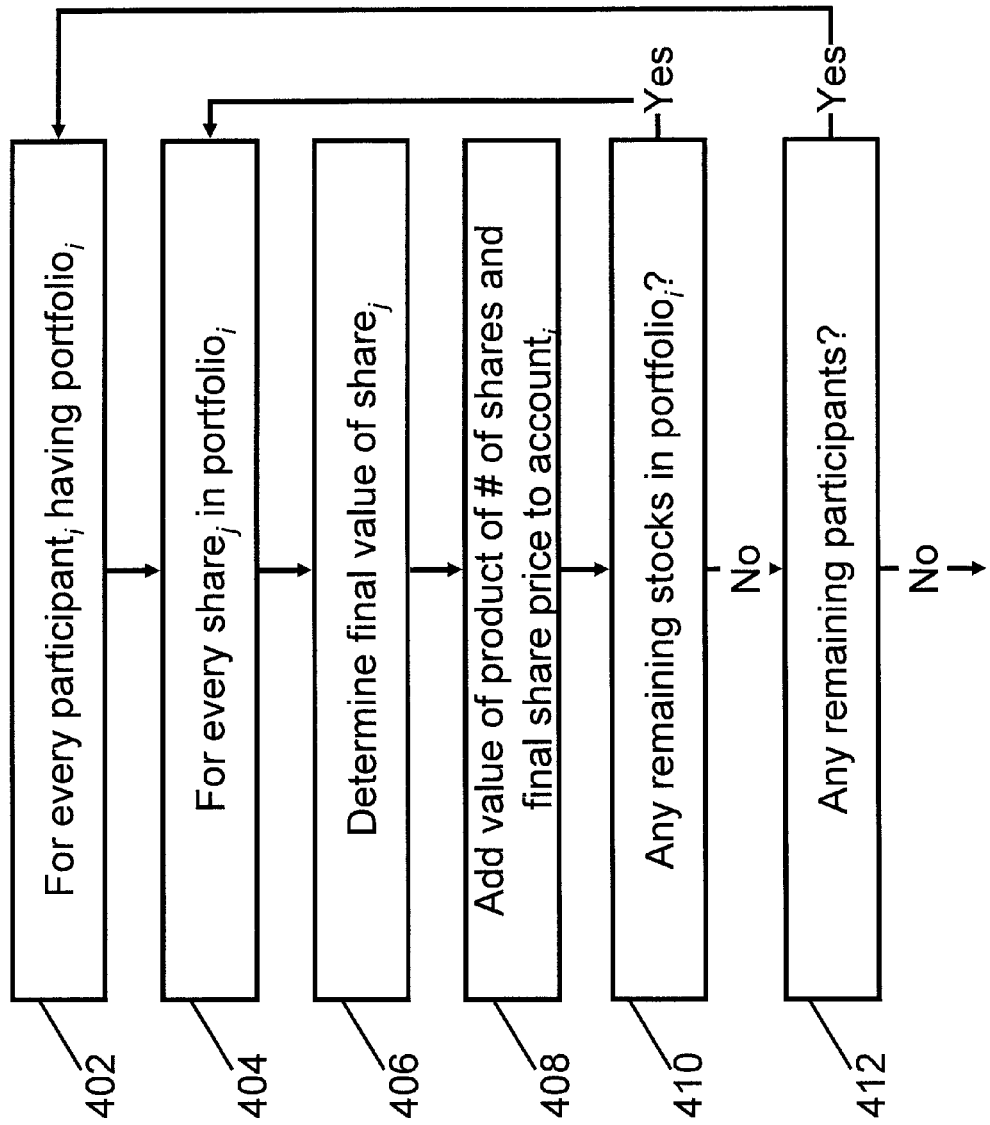
FIG. 13 is a flowchart illustrating a method of redeeming shares held by a plurality of participants in accordance with a ranking of a team associated with their corresponding shares according to one embodiment of the present invention.

FIG. 13 is a flowchart illustrating a method of crediting and debiting participants' accounts at the end of a season in accordance with one embodiment of the present invention. For each participant i (or $participant_i$) having a corresponding portfolio of shares (or $portfolio_i$) (402), the redemption processor 324 iterates through each of the types of shares (or $share_j$) in $portfolio_i$ (404), determines the final value of one share of $share_j$ based on the final benchmark poll (as described above) (406), adds the value of the product of the number of shares of $share_j$ in $portfolio_i$ (408) until it has iterated through all of the shares in $portfolio_i$ (410), and repeats the process for each participant having $portfolio_i$ (412).

Figure 14:
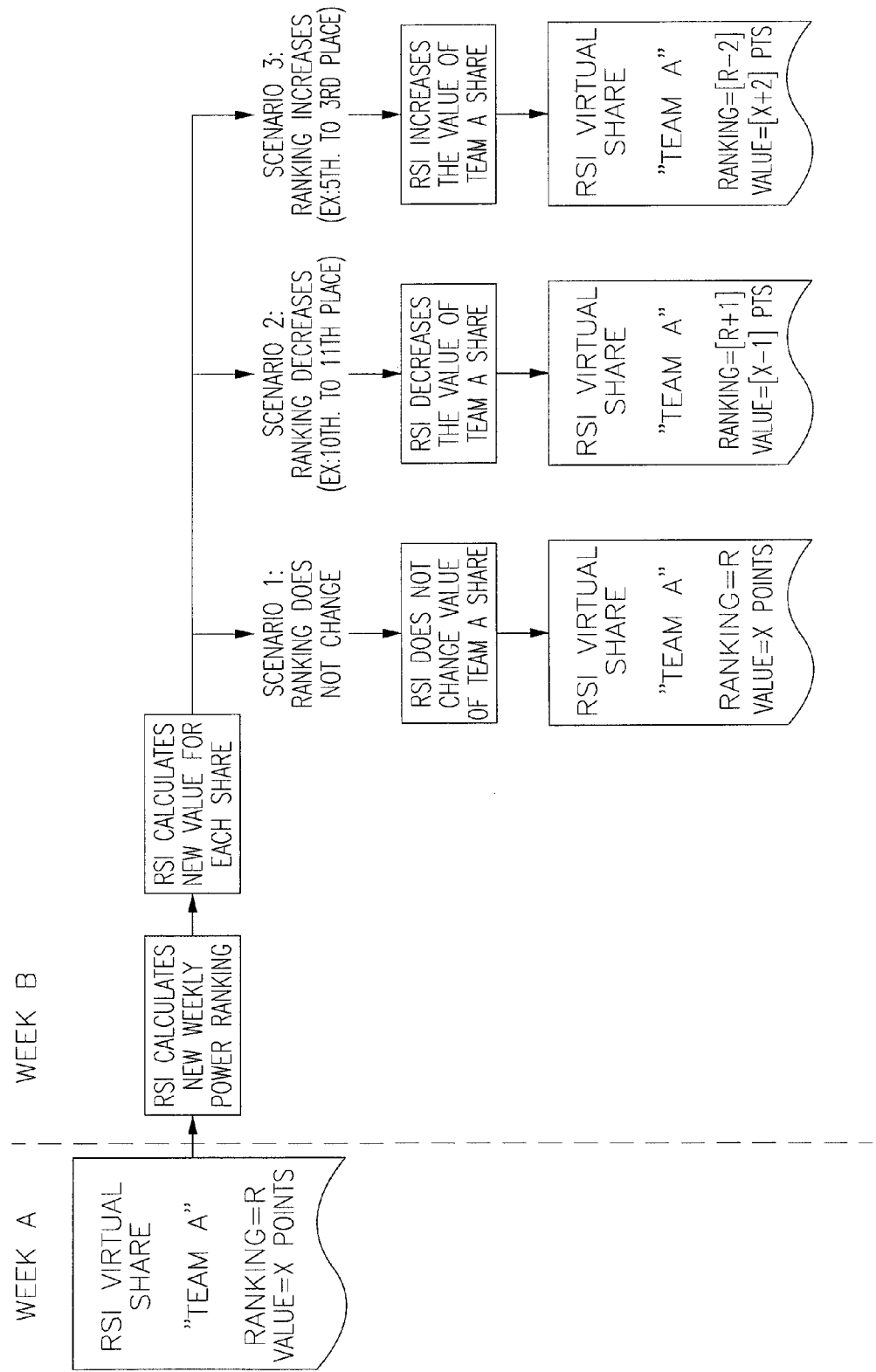
FIG. 14 is a flowchart illustrating a method of updating the value of a share based on a change in power rankings according to one embodiment of the present invention.

FIG. 14 is a flowchart illustrating a method of updating the value of a share based on a change in power rankings according to one embodiment of the present invention.

In some embodiments, the shares are redeemed by the SportShares application. In other embodiments, the shares are redeemed from the cash accounts of the participants.

In one embodiment, the SportShares application also allows a participant to make cash withdrawals from his account. FIG. 15 is a screenshot according to one embodiment of the present invention illustrating a component of the user interface of the SportShares Application which allows a participant to withdraw cash funds from his account (e.g., to be deposited into his bank account or sent as a check).

Figure 16:
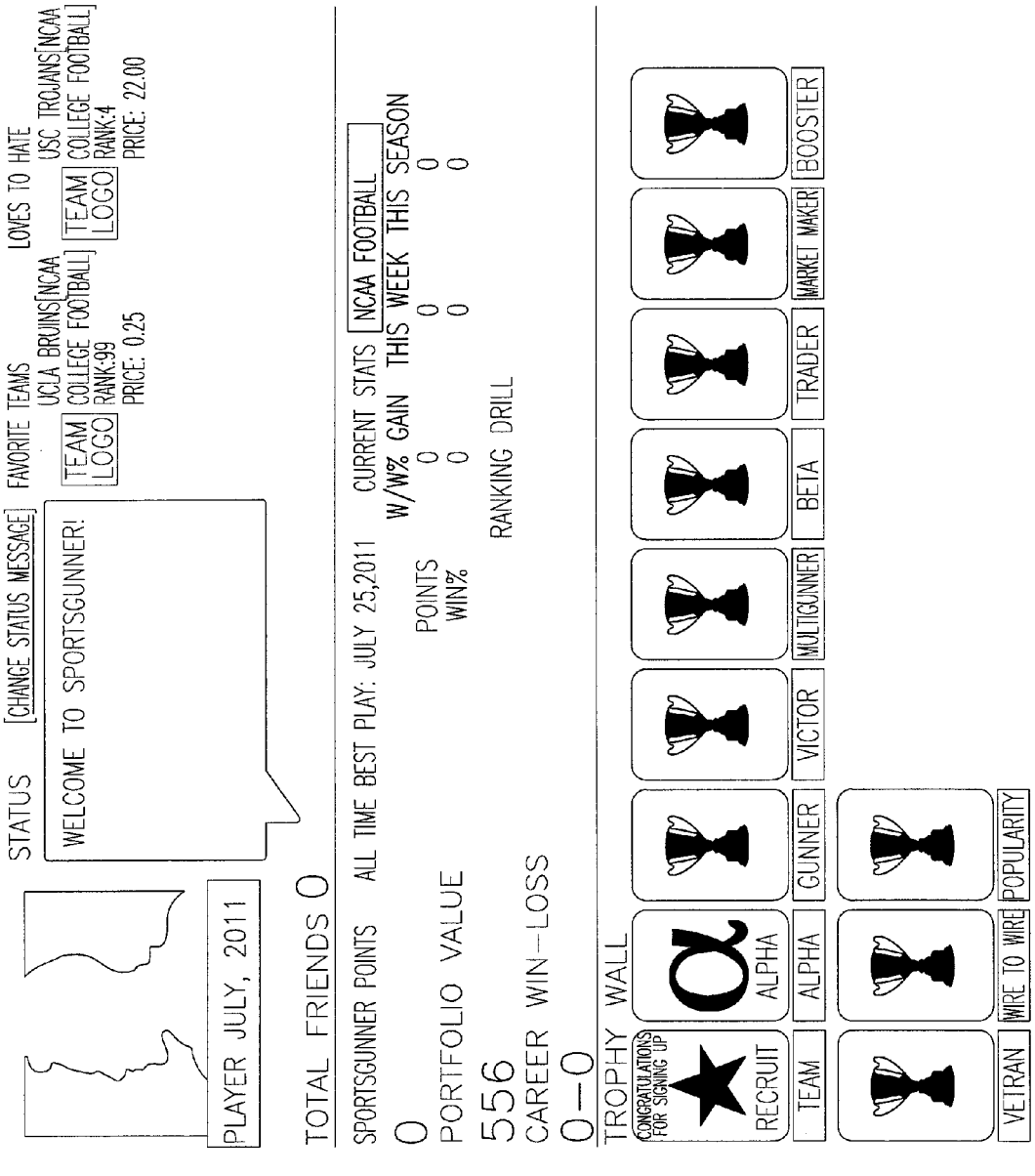
FIG. 16 is a screenshot illustrating a participant's profile according to one embodiment of the present invention.

In some embodiments of the present invention, the SportShares Application further includes a social networking layer. FIG. 16 is a screenshot according to one embodiment of the present invention illustrating a participant's profile, which may include information such as the participant's favorite teams, the participant's current stats (e.g., points earned, win/loss record, portfolio value), a list of the trophies (or badges) earned by the participant by completing particular tasks, etc.

Figure 17:
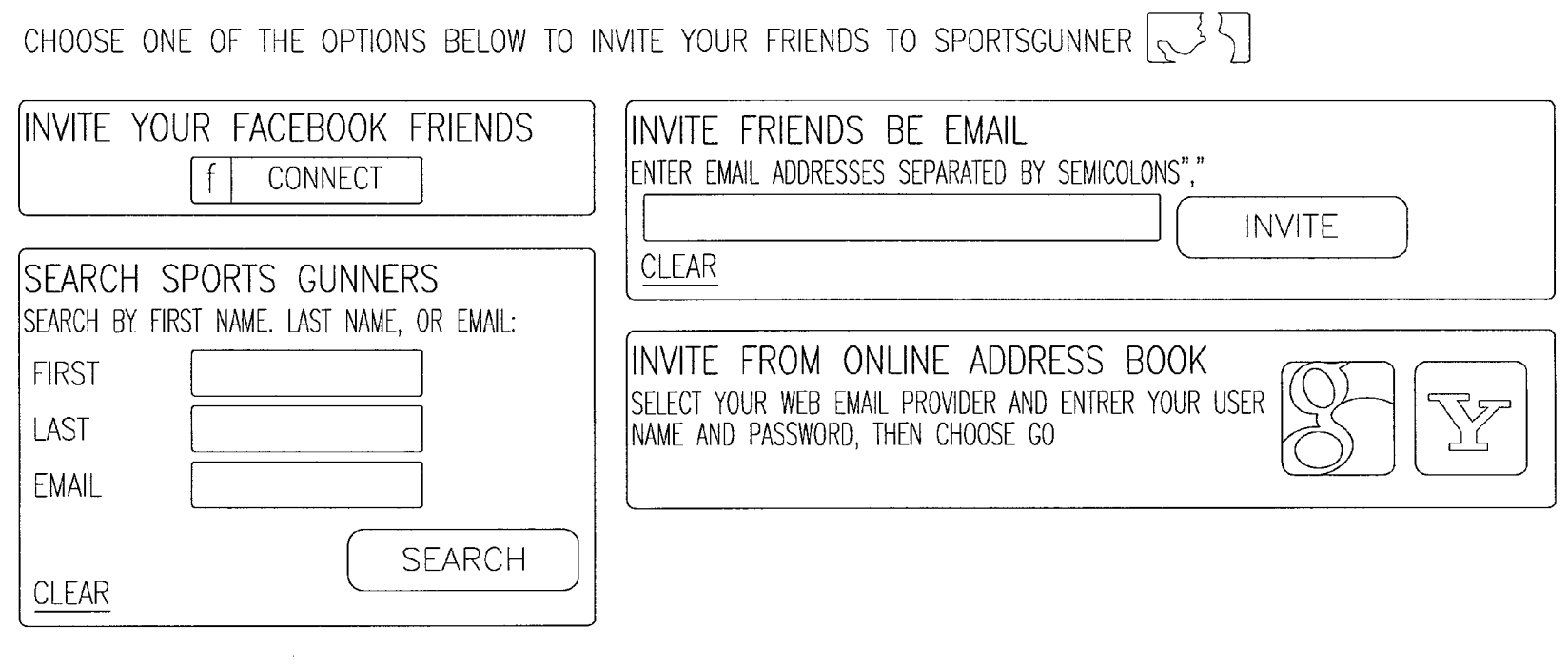
Figure 18:

Participants may also choose to associate with other participants via a "friend" mechanism similar to the systems used on social networking sites such as Facebook and LinkedIn. FIG. 17 is a screenshot of a user interface according to one embodiment of the present invention for searching for other participants to add or connect to as "friends". FIG. 18 is a screenshot of a user interface according to one embodiment of the present invention of a user interface listing "friends and rivals" that a participant is associated with.

In one embodiment of the present invention, other actions taken by other participants (e.g., "friends") may be shown to a participant in an activity feed. FIG. 19 is a screenshot of an activity feed according to one embodiment of the present invention in which, for example, the recent purchases and sales of SportShares by friends and recent addition of new friends can be publicized in the activity feed. In some embodiments of the present invention, participants can leave comments regarding these events (e.g., the trades) in the activity feed.

FIG. 20 is a screenshot of leaderboards which show current ranks of participants based on point totals may be displayed according to one embodiment of the present invention. These leaderboards may show the current standings across the entire platform (e.g., "SportsGunner Nation") and may also show standings among a circle of friends. In another embodiment of the present invention, as shown in FIG. 21, specific leaderboards can be shown based on sport, region or cities, time period (e.g., week, month, season), and ranking criteria (e.g., number of points earned, percentage increase in points, total points, portfolio size, total wins, and number of trades).

In another embodiment of the present invention, participants can make predictions as to whether a given team will go up, go down, or remain in the same position in the rankings during a given week. Participants may score points in accordance with the number of accurate predictions made. FIG. 22 is a screenshot illustrating an interface for inputting predictions according to one embodiment of the present invention.

FIG. 23 is a screenshot illustrating an interface for managing membership in and status of competitive "leagues" according to one embodiment of the present invention in which multiple participants trade SportShares and compete to end up with the best portfolio by the end of a season.

FIG. 24 is a screenshot illustrating an interface for viewing most recent open orders according to one embodiment of the present invention. According to one embodiment, the list of recent open orders also includes an option for the current participant to complete the order by selling or buying shares at the price offered in the open order.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claim, and equivalents thereof.

For example, embodiments of the present invention may be directed to rankings of competitors other than those of sports teams and individual athletes, such as college rankings, chess rankings, sales representatives by revenue, etc.

What is claimed is:

1. A computer system for providing a market for a plurality of participants to invest in a plurality of shares of corresponding sports competitors, the computer system comprising:
   a central processing unit;
   memory coupled to the central processing unit;
   a data bus coupled to the central processing unit;
   a persistent storage device coupled to the data bus; and
   a network interface device coupled to the data bus,
   the computer system being configured to:
      store a plurality of share holdings of the participants;
      store a plurality of credit balances of the participants; and
      redeem shares at the conclusion of a period,
   wherein the computer system is configured to redeem shares by calculating an amount that the credit balance of each participant should be modified in accordance with a plurality of values of corresponding ones of the shares at the conclusion of the period and the share holdings of a corresponding participant of the participants,
   wherein the values of the shares at the conclusion of the period is determined solely based on a benchmark ranking of the sports competitors at the conclusion of the period,
   wherein the benchmark ranking is an element selected from the group consisting of a sports season ending poll, a ranking based on points earned in accordance with performance in tournaments, a ranking based on a rating system, and a ranking based on an Elo rating system,
   wherein the benchmark ranking comprises at least three sports competitors, and
   wherein the value of the shares of a top ranked sports competitor of the at least three sports competitors and the value of the shares of the second ranked sports competitor of the at least three sports competitors are both non-zero.

2. The computer system of claim 1, wherein the value of the shares corresponding to the top ranked sports competitor of the benchmark ranking are greater than the value of the shares corresponding to a lowest ranked sports competitor of the benchmark ranking.

3. The computer system of claim 2, wherein the value of the shares associated with a competitor of the sports competitors decreases linearly with the decreasing rank of the competitor in the benchmark ranking.

4. The computer system of claim 1, wherein the sports competitors are sports teams.

5. The computer system of claim 4, wherein the benchmark ranking is a poll.

6. The computer system of claim 1, wherein the sports competitors are individual athletes.

7. The computer system of claim 1, wherein the system is further configured to:
   accept a plurality of orders from participants to buy shares and to sell shares;
   complete the orders to trade shares by matching the orders to buy shares with the orders to sell shares; and
   modify the share holdings and the credit balances of participants in accordance with the completed orders.

8. The computer system of claim 7, wherein the market is a pari-mutuel market.

9. The computer system of claim 1, wherein the system is further configured to:
   accept a plurality of orders from participants to buy shares and to sell shares;
   complete the orders to trade shares by issuing shares when completing an order to buy shares and by buying back shares when completing an order to sell shares; and
   modify the share holdings and the credit balances of the participants in accordance with the orders.

10. The computer system of claim 9, wherein the order to sell shares is an order to short sell shares.

11. The computer system of claim 1, wherein the system is further configured to display a scoreboard of a competition between one or more of the sports competitors alongside a plurality of prices of pending orders associated with shares associated with the one or more sports competitors.

12. The computer system of claim 1, wherein the system is further configured to display a ticker showing recently completed orders.

13. A method of operating a market for a plurality of participants to invest in a plurality of sports competitors using a computer system, the method comprising:
   storing a plurality of share holdings of the participants in the computer system;
   storing a plurality of credit balances of the participants in the computer system; and
   redeeming shares at the conclusion of a period in the computer system,
   wherein redeeming shares comprises:
      calculating an amount that the credit balance of each corresponding participant of the participants should be modified in accordance with a plurality of values of corresponding ones of the shares at the conclusion of the period and the share holdings of the corresponding participant, and determining the values of the shares based on a benchmark ranking of the sports competitors at the conclusion of the period, wherein the benchmark ranking is an element selected from the group consisting of a sports season ending poll, a ranking based on points earned in accordance with performance in tournaments, a ranking based on a rating system, and a ranking based on an Elo rating system, wherein the benchmark ranking comprises at least three sports competitors, and wherein the value of the shares of a top ranked sports competitor of the at least three sports competitors and the value of the shares of the second ranked sports competitor of the at least three sports competitors are both non-zero.

14. The method of claim 13, wherein the value of the shares corresponding to the top ranked sports competitor of the benchmark ranking are greater than the value of the shares corresponding to a lowest ranked sports competitor of the benchmark ranking.

15. The method of claim 14, wherein the value of the shares associated with a sports competitor of the sports competitors decreases linearly with the decreasing rank of the sports competitor in the benchmark ranking.

16. The method of claim 13, wherein the sports competitors are sports teams.

17. The method of claim 16, wherein the benchmark ranking is a poll.

18. The method of claim 13, wherein the sports competitors are individual athletes.

19. The method of claim 13, further comprising:
accepting a plurality of orders from the participants to buy shares and to sell shares;
completing the orders by matching the orders to buy shares with the orders to sell shares; and
modifying the share holdings and the credit balances of participants in accordance with completed orders.

20. The method of claim 19, wherein the market is a pari-mutuel market.

21. The method of claim 13, further comprising:
accepting a plurality of orders from the participants to buy shares and to sell shares;
completing orders by issuing shares when completing an order to buy shares and by buying back shares when completing an order to sell shares; and
modifying the share holdings and the credit balances of the participants in accordance with the orders.

22. The method of claim 21, wherein the order to sell shares is an order to short sell shares.

23. The method of claim 13, further comprising displaying a scoreboard of a competition between one or more of the sports competitors alongside a plurality of prices of pending orders associated with shares associated with the one or more sports competitors.

24. The method of claim 13, further comprising displaying a ticker showing recently completed orders.

* * * * *